US007693545B2

(12) United States Patent
Park

(10) Patent No.: US 7,693,545 B2
(45) Date of Patent: Apr. 6, 2010

(54) SYSTEM AND METHOD FOR CONTROLLING FUNCTIONS OF MOBILE COMMUNICATION TERMINAL IN A RESTRICTED ZONE

(75) Inventor: Chong-Yok Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 806 days.

(21) Appl. No.: 11/007,018

(22) Filed: Dec. 8, 2004

(65) Prior Publication Data

US 2005/0181780 A1    Aug. 18, 2005

(30) Foreign Application Priority Data

Feb. 5, 2004 (KR) .................... 10-2004/0007627
Oct. 1, 2004 (KR) .................... 10-2004/007847

(51) Int. Cl.
*H04Q 7/20* (2006.01)
*H04M 3/16* (2006.01)
*H04M 11/04* (2006.01)

(52) U.S. Cl. .................. 455/556.1; 455/404.1; 455/411
(58) Field of Classification Search ............ 455/1, 455/404.2, 456.4, 422.1, 414.1, 456.1, 456.3, 455/456.6, 457, 466, 418, 419, 420, 421, 455/404.1, 556, 411, 556.1, 553.1

See application file for complete search history.

(56) References Cited

U.S. PATENT DOCUMENTS

| 6,738,572 | B2 * | 5/2004 | Hunter | 396/56 |
|---|---|---|---|---|
| 7,038,699 | B2 * | 5/2006 | Sato et al. | 345/633 |
| 7,127,271 | B1 * | 10/2006 | Fujisaki | 455/556.1 |
| 7,146,188 | B2 * | 12/2006 | Deeds | 455/556.1 |
| 7,343,148 | B1 * | 3/2008 | O'Neil | 455/404.2 |
| 7,406,331 | B2 * | 7/2008 | Middleton | 455/556.1 |
| 7,471,966 | B2 * | 12/2008 | Sawayama et al. | 455/575.3 |
| 7,577,461 | B2 * | 8/2009 | Sawayama et al. | 455/556.1 |
| 2002/0106202 | A1 * | 8/2002 | Hunter | 396/56 |
| 2003/0008662 | A1 * | 1/2003 | Stern et al. | 455/456 |
| 2003/0092428 | A1 | 5/2003 | Awada et al. | |
| 2003/0134627 | A1 * | 7/2003 | Himmel et al. | 455/419 |
| 2003/0207683 | A1 * | 11/2003 | Lempio et al. | 455/422.1 |

(Continued)

FOREIGN PATENT DOCUMENTS

CN    1428944    7/2003

(Continued)

*Primary Examiner*—Tilahun Gesesse
(74) *Attorney, Agent, or Firm*—The Farrell Law Firm, LLP

(57) ABSTRACT

Disclosed are a system and a method for controlling functions of a mobile communication terminal when in a predetermined zone. The system includes a function control apparatus for requesting a function list stored in the mobile communication terminal when detecting that the mobile communication terminal has entered a predetermined zone, indicating functions to be deactivated and generating a first function control list when the function list is received from the mobile communication terminal, and transmitting the first function control list to the mobile communication terminal; and the mobile communication terminal for transmitting the function list to the function control apparatus in response to the request for the function list received from the function control apparatus, and updating the stored function list in accordance with the first function control list when the first function control list is received from the function control apparatus.

9 Claims, 4 Drawing Sheets

U.S. PATENT DOCUMENTS

| | | | |
|---|---|---|---|
| 2004/0132484 A1* | 7/2004 | Murakami | 455/550.1 |
| 2004/0147255 A1* | 7/2004 | Lee | 455/422.1 |
| 2004/0155969 A1* | 8/2004 | Hayashi | 348/207.99 |
| 2005/0064856 A1* | 3/2005 | Atkin et al. | 455/418 |
| 2005/0075117 A1* | 4/2005 | Jang | 455/456.4 |
| 2005/0134696 A1* | 6/2005 | Nath et al. | 348/211.9 |
| 2006/0052135 A1* | 3/2006 | Miyauchi | 455/556.1 |
| 2007/0129012 A1* | 6/2007 | Snow | 455/26.1 |

FOREIGN PATENT DOCUMENTS

| | | |
|---|---|---|
| EP | 1 361 766 | 11/2003 |
| EP | 1361766 A2 * | 11/2003 |
| JP | 2002-027554 | 1/2002 |

* cited by examiner

SYSTEM AND METHOD FOR CONTROLLING FUNCTIONS OF MOBILE COMMUNICATION TERMINAL IN A RESTRICTED ZONE

PRIORITY

This application claims priority to an application entitled "System And Method For Controlling Functions Of Mobile Communication Terminal" filed in the Korean Intellectual Property Office on Feb. 5, 2004 and assigned Serial No. 2004-7627, and to an application entitled "System And Method For Controlling Functions Of Mobile Communication Terminal" filed in the Korean Intellectual Property Office on Oct. 1, 2004 and assigned Serial No. 2004-78471, the contents of both which are incorporated herein by reference.

BACKGROUND OF THE INVENTION

1. Field of the Invention

The present invention relates to a system and a method for controlling functions of a mobile communication terminal, and more particularly to a system and a method for controlling predetermined functions of a mobile communication terminal in a predetermined zone.

2. Description of the Related Art

Recently, with the rapid development of the mobile communication field, mobile communication terminals can perform various functions. For example, camera phones have emerged that can perform camera functions using cameras embedded in the mobile communication terminal, without a separate camera. With the appearance of such mobile communication terminals having camera functions as described above, inappropriate use of camera functions and data transmission in a company or a public place may give rise to inappropriate behavior or social criticism. For instance, taking a photograph of a person in a public bath using a camera phone having a camera function and transmitting the photographed image is very problematic. Another problem associated with camera phones involves preservation of confidential information of a company. Security of such confidential information can be compromised by the ability to photograph by a camera phone and transmit the photograph to an exterior location as a data file.

To prevent the camera function or the data transmission function from being used in a predetermined zone requiring security as described above, conventional methods prohibit a user from carrying the camera phone going into a predetermined zone. However, such conventional methods prevent the mobile communication terminal itself from being used, thereby depriving the user not only of the camera functions and the data transmission function, but also of other functions, such as a communication function, a text transmission function, address book function, planner function or alarm function. The inability to utilize the other functions causes the user to suffer an unnecessary inconvenience.

There exists another conventional method for restricting the functions of the mobile communication terminal in a predetermined zone which utilizes a satellite or a predetermined device. However, such a method may violate individuals' private lives.

The conventional methods described above prevent the camera function or the data transmission function from being used in a predetermined zone by prohibiting a user from carrying a mobile communication terminal itself having these functions into the predetermined zone. Therefore, the user suffers from inconvenience of not being able to access other functions commonly provided in the mobile communication terminal.

SUMMARY OF THE INVENTION

Accordingly, the present invention has been made to solve the above-mentioned problems occurring in the prior art, and an object of the present invention is to provide a system and a method for controlling functions of a mobile communication terminal.

Another object of the present invention is to provide a system and a method for controlling functions of a mobile communication terminal in a predetermined zone.

In order to accomplish the aforementioned objects, according to one aspect of the present, there is provided a system for controlling functions of a mobile communication terminal, the system including a function control apparatus for requesting a function list stored in the mobile communication terminal when detecting that the mobile communication terminal has entered a predetermined zone, indicating functions to be deactivated and generating a restricted function control list when the function list is received from the mobile communication terminal, and transmitting the first function control list to the mobile communication terminal; and the mobile communication terminal for transmitting the function list to the function control apparatus in response to the request for the function list received from the function control apparatus, and updating the stored function list into the first function control list when the first function control list is received from the function control apparatus.

In order to accomplish the aforementioned objects, according to one aspect of the present, there is provided a method for controlling functions of a mobile communication terminal in a system including a function control apparatus for storing information of functions to be deactivated and the mobile communication terminal, the method including requesting by the function control apparatus a function list stored in the mobile communication terminal when detecting that the mobile communication terminal has entered a predetermined zone; transmitting by the mobile communication terminal the function list to the function control apparatus in response to the request for the function list received from the function control apparatus; indicating by the function control apparatus functions to be deactivated and generating a first function control list when the function list is received from the mobile communication terminal, and transmitting the first function control list to the mobile communication terminal; and updating by the mobile communication terminal the stored function list into the first function control list when the first function control list is received from function control apparatus.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments according to the present invention will be described with reference to the accompanying drawings. In the following description of the present invention, a detailed description of known functions and configurations incorporated herein is omitted to avoid making the subject matter of the present invention unclear.

Figure 1:
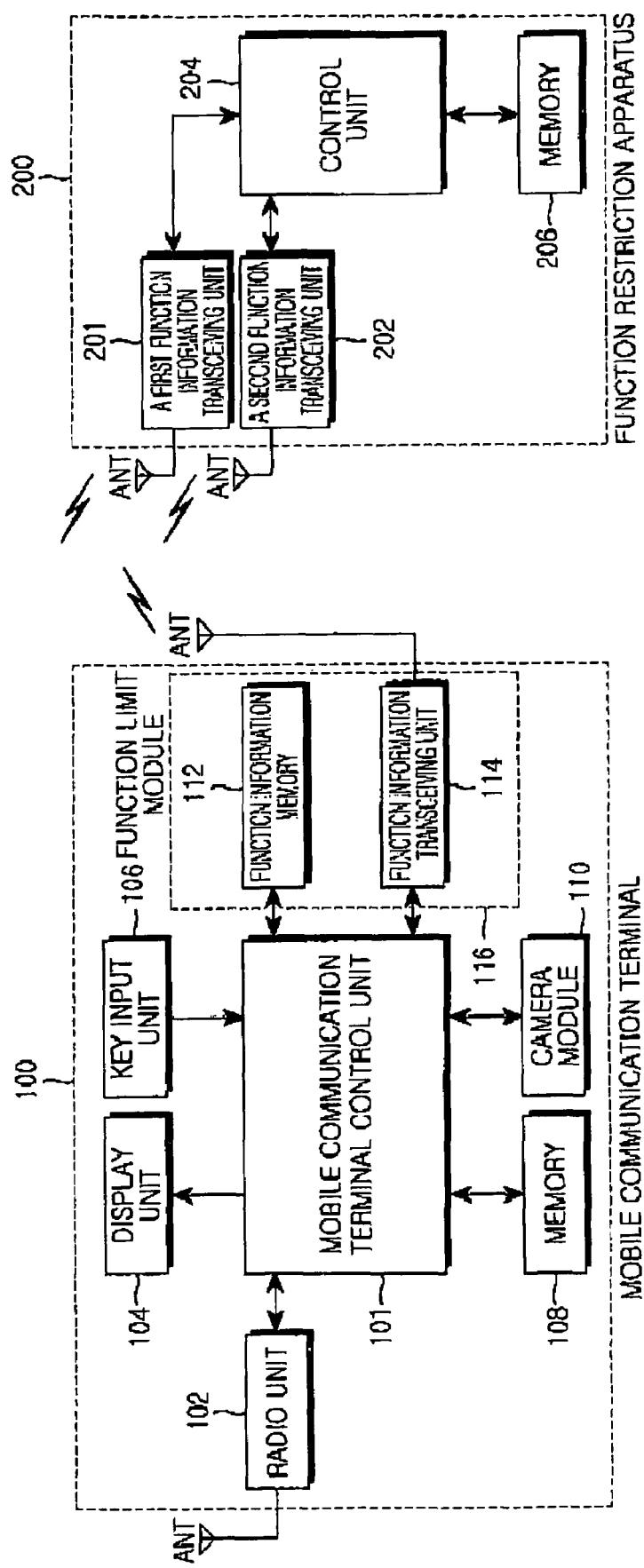
FIG. 1 is a block diagram of a mobile communication terminal and an external device for deactivating predetermined functions of the mobile communication terminal in a predetermined zone according to a first embodiment of the present invention.

Hereinafter, a system for controlling functions of a mobile communication terminal according to a preferred embodiment of the invention in a predetermined zone requiring security will be described with reference to FIG. 1. FIG. 1 is a block diagram of the mobile communication terminal and an external device for deactivating predetermined functions of the mobile communication terminal in the predetermined zone according to a preferred embodiment of the present invention.

The mobile communication terminal 100 includes a function limit module 116 for preventing designated functions from being used in the predetermined zone requiring security. Herein, the predetermined zone in the present invention refers to a place such as a public bath, a company necessarily requiring security, or a place in which there is a possibility of violating the private life or rights of other individuals. The function limit module 116 contained in the mobile communication terminal 100 stores a function list of all functions capable of being performed by the mobile communication terminal 100. Further, the present invention includes a function control, i.e. restriction, apparatus 200 for preventing predetermined functions from among functions stored in the mobile communication terminal 100 from being used in the predetermined zone. Herein, the a function control apparatus 200 includes a transceiver unit capable of communicating with the mobile communication terminal 100, in order to control the terminal 100 from outside of the mobile communication terminal 100 without physical contact with the mobile communication terminal 100.

Hereinafter, an internal construction of the mobile communication terminal 100 will be described. The mobile communication terminal 100 includes a control unit 101, a radio unit 102, a display unit 104, a key input unit 106, a memory 108, a camera module 110, and the function limit module 116. The control unit 101 controls a general operation of the mobile communication terminal 100. Especially, in the present invention, when a function information request is received from the function control apparatus 200, i.e. the external device, the control unit 101 responds to the request and transmits a function information list stored in a function information memory 112 to the function control apparatus 200 through a function information transceiver unit 114.

Further, when a function list is received from the function control apparatus 200 through the function information transceiver unit 114, the control unit 101 stores the received function list in the function information memory 112. Herein, a method for storing the received function list updates a function list that has been already previously stored in accordance with the received function list. Then, the mobile communication terminal 100 performs a reset operation, and the control unit 101 controls only performable operations in the updated function information memory 112 to operate the mobile communication terminal 100.

The radio unit 102, which is controlled by the control unit 101, receives a high frequency radio signal through an antenna (ANT), and down-converts the high frequency radio signal via baseband modulation. The display unit 104 displays a current state of the mobile communication terminal 100 or a change of state of program execution. The display unit 104 may employ a liquid crystal display (LCD).

Herein, when the function limit has been set in the predetermined zone, the present invention preferably displays a screen informing a user of the function limit set. The key input unit 106 has a key matrix structure, and includes a plurality of numeral keys and function keys for performing various functions. The key input unit 106 outputs an electric signal of key data generated by a key input of the user to the control unit 101. The memory 108 temporarily stores a program processed by the control unit 101 or provides a stored program via the control unit 101. The memory 108 typically includes a ROM for storing an operation program, an electrically programmable EEPROM, a RAM, or so forth. The camera module 110 is controlled by the control unit 101 to photograph a subject, outputs an image signal according to the photographing, and generates screen data for displaying the image signal. The function limit module 116 according to the present invention includes the function information memory 112, the function information transceiver unit 114, and an internal antenna. The function limit module 116 may be achieved by a smart chip.

The function information memory 112 stores the function list of all functions that can performed by the mobile communication terminal 100. Further, the function information transceiver unit 114 receives a signal transmitted from the function control apparatus 200 and transmits a signal from the mobile communication terminal 100 to the function control apparatus 200.

Meanwhile, the function control apparatus 200 includes a first function information transceiver unit 201, a second function information transceiver unit 202, a control unit 204, and a memory 206.

The first function information transceiver unit 201 transmits or receives data to/from the mobile communication terminal 100 that is going into or out of a predetermined zone. The second function information transceiver unit 202 transmits or receives data to/from the mobile communication terminal 100 leaving the predetermined zone.

When the function list is received from the mobile communication terminal 100 through the first function information transceiver unit 201, the control unit 204 of the function control apparatus 200 indicates a function to be deactivated from among the functions of received function list, and generates and transmits a first function list to the mobile communication terminal 100. Herein, the first function list transmitted to the mobile communication terminal 100 is preferably encrypted before being transmitted.

As described above, when the mobile communication terminal 100 enters or leaves the predetermined zone, the function control apparatus 200 may also transmit or receive data through the different transceiver units 201 and 202 or may transmit or receive data through one transceiver unit.

Figure 4:
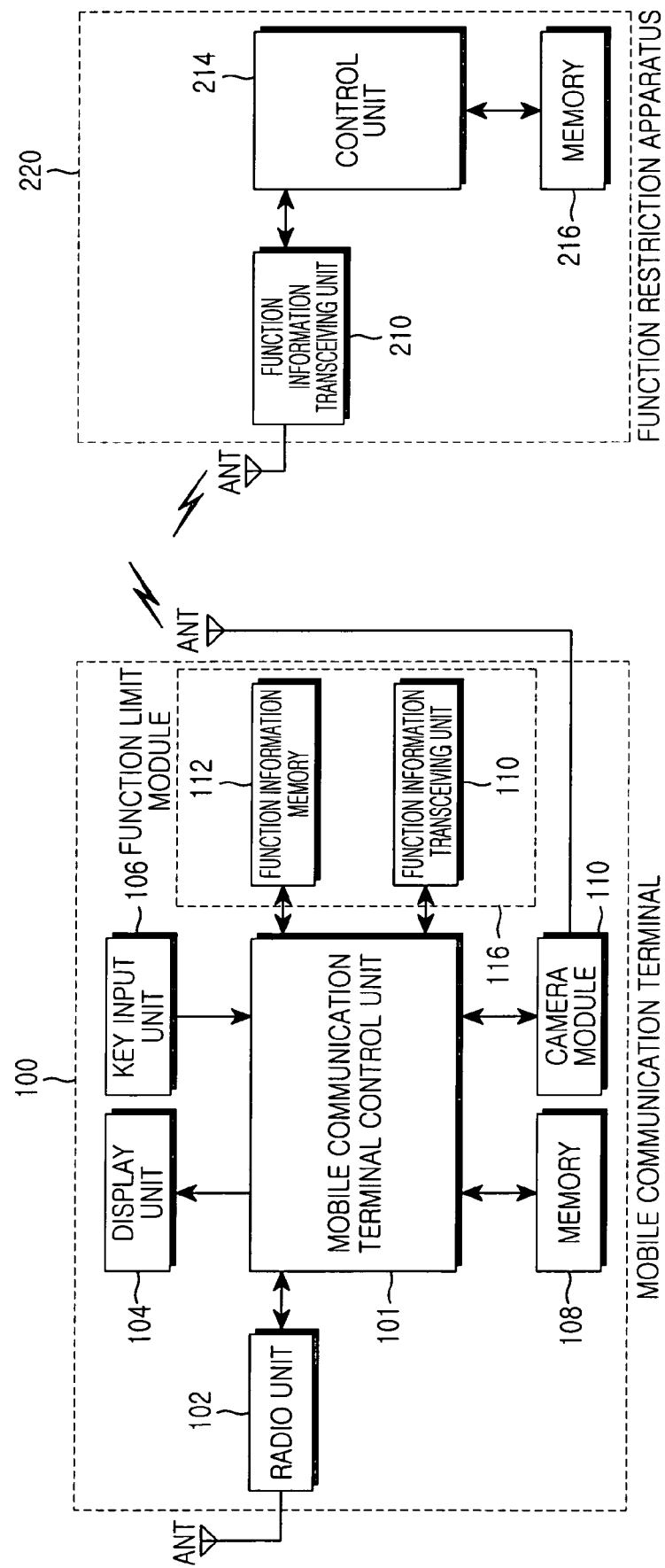
FIG. 4 is a block diagram of a mobile communication terminal and an external device for deactivating predetermined functions of the mobile communication terminal in a predetermined zone according to a second embodiment of the present invention.

When the mobile communication terminal 100 enters or leaves the predetermined zone, an embodiment in which data are transmitted/received through one transceiver unit for a function control is shown in FIG. 4. FIG. 4 is a block diagram of the mobile communication terminal and an external device for deactivating predetermined functions of the mobile communication terminal in a predetermined zone according to a second embodiment of the present invention.

In FIG. 4, since the mobile communication terminal 100 has the same construction as that of the mobile communication terminal 100 in FIG. 1. A function control apparatus 220 includes a function information transceiver unit 210, a control unit 214 and a memory 216. When function lists are received from the mobile communication terminal 100 through the function information transceiver unit 210, the control unit 214 indicates a function to be deactivated from among the functions of the received function list and transmits the function list to the mobile communication terminal 100 through the function information transceiver unit 210. Herein, the function list to be transmitted to the mobile communication terminal 100 is preferably encrypted before being transmitted.

Hereinafter, a flow of signals transmitted between the mobile communication terminal 100 and the function control apparatus 200 for controlling the functions of the mobile communication terminal 100 in the predetermined zone will be described with reference to FIG. 2.

Figure 2:
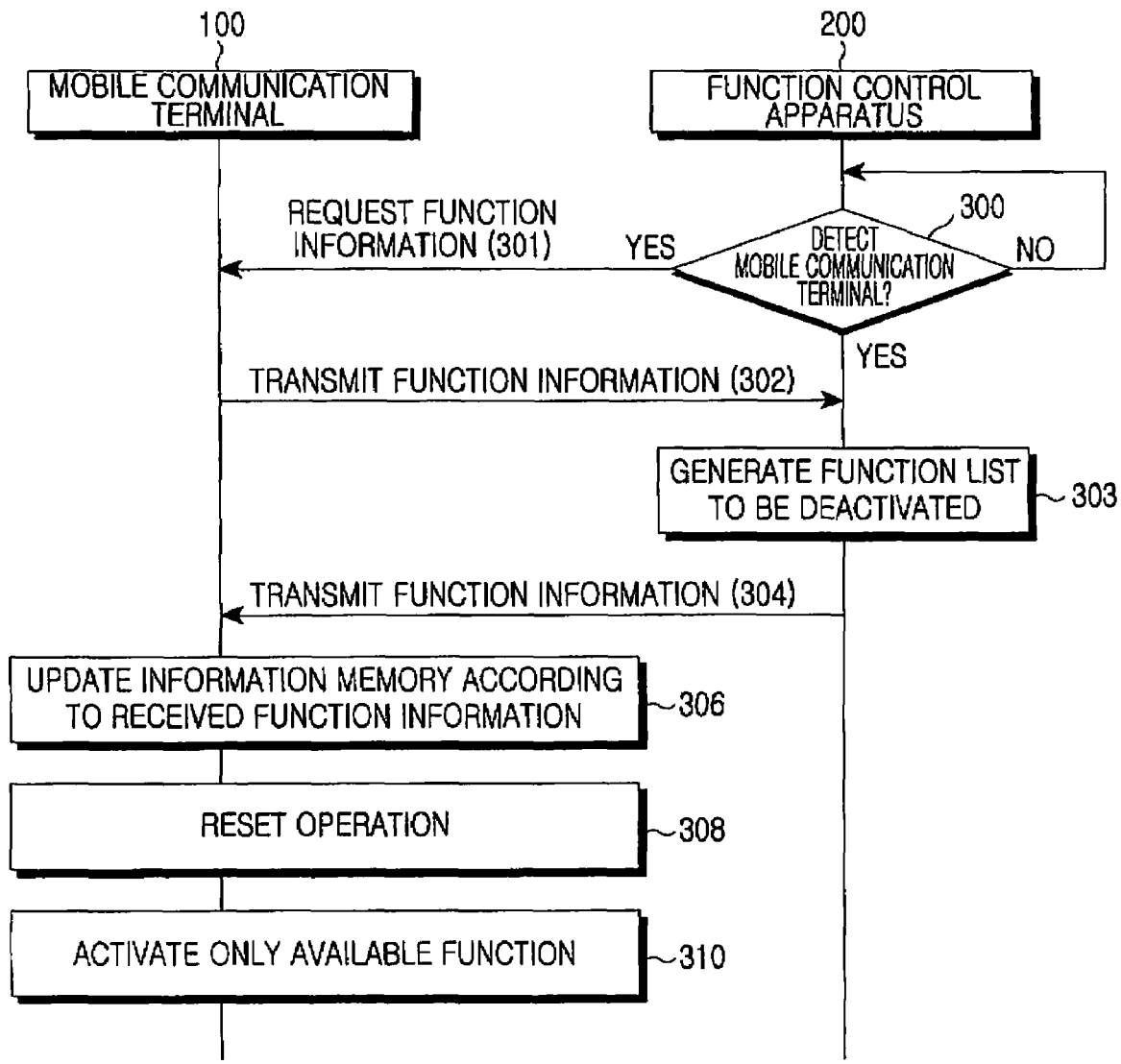
FIG. 2 is a flowchart illustrating a flow of signals for controlling functions of a mobile communication terminal when the mobile communication terminal goes into a predetermined zone according to an embodiment of the present invention.

FIG. 2 is a flowchart illustrating a flow of signals for controlling functions of a mobile communication terminal when the mobile terminal goes into the predetermined zone according to an embodiment of the present invention. Herein, FIG. 2 employs the mobile communication terminal 100, which includes the function limit module 116 shown in FIGS. 1 and 4, as an example. For convenience, the description provided in regard to FIG. 2 makes reference to the function control apparatus 200 of FIG. 1 as an example. It will be recognized that similar operation of control flow can be performed between the mobile communication terminal 100 and the function control apparatus 220 of FIG. 4.

The mobile communication terminal 100 includes the function limit module 116, and the function limit module 116 stores the function list of every function of the mobile communication terminal. Further, the function control apparatus 200 stores a function limit list for preventing predetermined functions of the mobile communication terminal 100 from being used in the predetermined zone. For instance, the function limit list may include any or all of a camera function, a data transceiving function, etc.

When the function control apparatus 200 detects the mobile communication terminal 100 in step 300, the function control apparatus 200 transmits a signal requesting function list information to the mobile communication terminal 100 in step 301. When the signal requesting the function list information is received from the function control apparatus 200, the mobile communication terminal 100 transmits the function list stored in the function information memory 112 thereof to the function control apparatus 200 through the function information transceiver unit 114 in step 302. Herein, the mobile communication terminal 100 also transmits packet identifier information together with the function list.

Then, the function control apparatus 200 indicates a function to be deactivated in the received function list, and generates a first, i.e. restricted, function list including predetermined functions to be deactivated in step 303. For instance, when the function list includes the camera function and the data transceiving function, the function control apparatus 200 sets the camera function and the data transceiving function as functions which cannot be used from among the function list received from the mobile communication terminal 100. Herein, the function control apparatus 200 encrypts and transmits the function list to be transmitted to the mobile communication terminal 100.

The function control apparatus 200 preferably stores in memory 206 that the mobile communication terminal 100 is a terminal that the function control apparatus 200 has transmitted the first function list of functions to be deactivated. The function control apparatus 200 transmits the generated first function list to the mobile communication terminal 100 in step 304. When the mobile communication terminal 100 receives the first function list the function information memory 112 is updated according to the received function information in step 306, and a reset operation is performed in step 308. Then, the mobile communication terminal 100 allows only usable functions from among the functions in the function list stored in the function information memory 112 to be activated in step 310. That is, as described in the above example, when the functions to be deactivated are the camera function and the data transceiving function, the camera function and the data transceiving function become unusable.

As described above, since the predetermined functions set to be deactivated are encrypted in the mobile communication terminal 100, a user cannot freely activate the deactivated functions set. Further, when the user leaves the predetermined zone, the deactivation of the predetermined functions having been set upon entrance to the predetermined zone can be automatically released by the function control apparatus 200.

Figure 3:
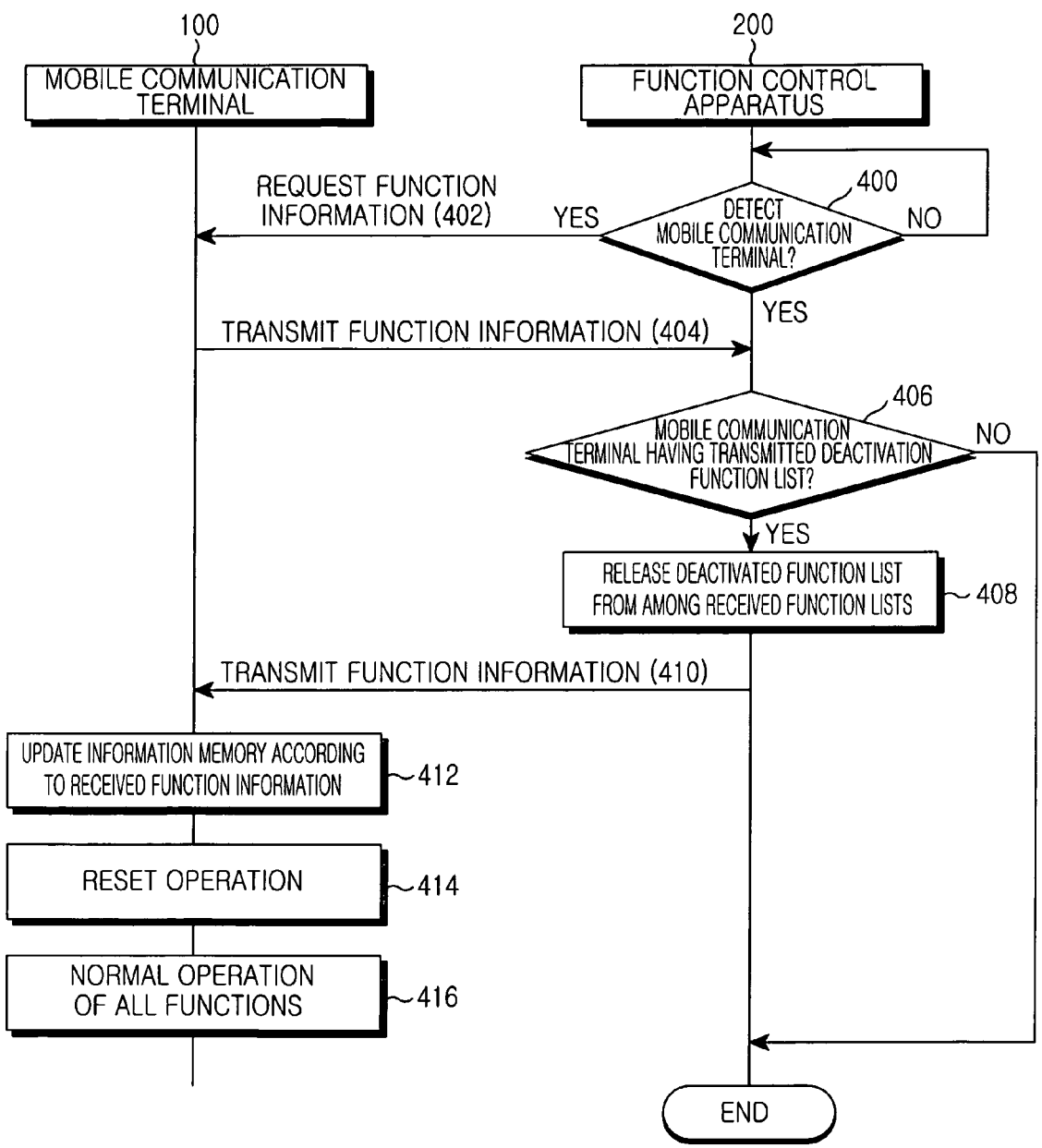
FIG. 3 is a flowchart illustrating a flow of signals for controlling functions of a mobile communication terminal when the mobile communication terminal leaves a predetermined zone according to an embodiment of the present invention.

Hereinafter, a flow of signals occurring when the user leaves the predetermined zone, transmitted between the mobile communication terminal 100 and the function control apparatus 200 for activating, i.e. restoring, the functions having been set to be deactivated in the mobile communication terminal 100, will be described with reference to FIG. 3. FIG. 3 is a flowchart illustrating a flow of signals for controlling the functions of the mobile communication terminal when the mobile communication terminal leaves the predetermined zone according to an embodiment of the present invention.

When the function control apparatus 200 detects the mobile communication terminal 100 in step 400, the function control apparatus 200 transmits a signal requesting function list information to the mobile communication terminal 100 in step 402. When the signal requesting the function list information is received from the function control apparatus 200, the mobile communication terminal 100 transmits the function list stored in the function information memory 112 thereof to the function control apparatus 200 through the function information transceiver unit 114 in step 404. Herein, the mobile communication terminal 100 also transmits packet identifier information together with the function list. The function control apparatus 200 first examines the packet identifier information in the transmitted data. Herein, when the mobile communication terminal 100 is a terminal having transmitted the function list that includes deactivated functions, step 408 is performed. Otherwise, the procedure ends. In step 408, the function control apparatus 200 indicates all received function information as functions to be activated and generates a function list. Then, the function control apparatus 200 transmits the function list to the mobile communication terminal 100 in step 410.

The mobile communication terminal 100 having received the function list updates the function information memory 112 according to the received function list in step 412. That is, the mobile communication terminal 100 sets all of its functions as being available. Then, the mobile communication terminal 100 performs a reset operation in step 414, and step 416 is performed. That is, the mobile communication terminal 100 regains control of all available functions.

As described above, in the present invention, when a user carrying a mobile communication terminal goes into a predetermined zone, predetermined functions of the mobile communication terminal can be deactivated through communication with an external device. In contrast, when the user leaves the predetermined zone, the functions having been deactivated through the communication with the external device are activated, so that these reactivated functions are normally operated. Therefore, the user can carry the mobile terminal regardless of place, and need not leave the mobile terminal when entering a restricted area.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof. For instance, an embodiment of the present invention employs a camera function and a data transceiving function as functions set to be unusable in a predetermined zone, but any functions of a mobile communication terminal can be deactivated.

What is claimed is:

1. A system for controlling functions of a mobile communication terminal, the system comprising:
   a function control apparatus for requesting a function list including all functions capable of being performed by the mobile communication terminal, the function list being stored in the mobile communication terminal, when detecting that the mobile communication terminal has entered a predetermined zone, and generating a first function control list by indicating at least one function to be selectively deactivated among all the functions of the function list, when the function list is received from the mobile communication terminal staying in the predetermined zone, and transmitting the generated first function control list to the mobile communication terminal; and
   the mobile communication terminal for transmitting the stored function list to the function control apparatus in response to the request for the function list received from the function control apparatus, and selectively deactivating the at least one function of the stored function list according to the transmitted first function control list.

2. The system as claimed in claim 1, wherein the mobile communication terminal performs a reset operation after selectively deactivating the at least one function.

3. The system as claimed in claim 1, wherein the function control apparatus requests the function list stored in the mobile communication terminal when detecting that the mobile communication terminal has left the predetermined zone, and generates a second function control list by indicating that all functions are to be activated among the functions in the function list when the function list is received from the mobile communication terminal, and transmits the second function control list to the mobile communication terminal.

4. The system as claimed in claim 3, wherein the mobile communication terminal transmits the stored function list to the function control apparatus in response to the request for the function list received from the function control apparatus, and updates the stored function list according to the second function control list when the second function control list is received from the function control apparatus.

5. The system as claimed in claim 4, wherein the mobile communication terminal performs a reset operation after updating the stored function list, thereby activating all functions of the mobile communication terminal.

6. A method for controlling functions of a mobile communication terminal in a system, the system including a function control apparatus for storing information of functions of the mobile communication terminal to be deactivated, the method comprising:
   requesting by the function control apparatus a function list including all functions capable of being performed by the mobile communication terminal, the function list being stored in the mobile communication terminal, when detecting that the mobile communication terminal has entered a predetermined zone;
   transmitting the stored function list to the function control apparatus in response to the request for the stored function list received from the function control apparatus;
   generating, by the function control apparatus, a first function control list by indicating at least one function to be selectively deactivated among all the functions of the received function list, when the function list is received from the mobile communication terminal;
   transmitting the generated first function control list to the mobile communication terminal; and
   selectively deactivating the at least one function of the stored function list of the mobile communication terminal according to the transmitted first function control list.

7. The method as claimed in claim 6, further including performing a reset operation after selectively deactivating the at least one function.

8. The method as claimed in claim 6, further including:
   requesting by the function control apparatus the function list stored in the mobile communication terminal when detecting that the mobile communication terminal has left the predetermined zone;
   transmitting the stored function list to the function control apparatus in response to the request for the function list received from the function control apparatus;
   generating, by the function control apparatus, a second function control list by indicating that all functions are to be activated among the functions in the function list when the function list is received from the mobile communication terminal;
   transmitting the second function control list to the mobile communication terminal; and
   updating the stored function list according to the second function control list when the second function control list is received from the function control apparatus.

9. The method as claimed in claim 8, further including performing a reset operation after updating the stored function list, thereby activating all functions of the mobile communication terminal.

* * * * *